United States Patent Office 2,989,615
Patented June 20, 1961

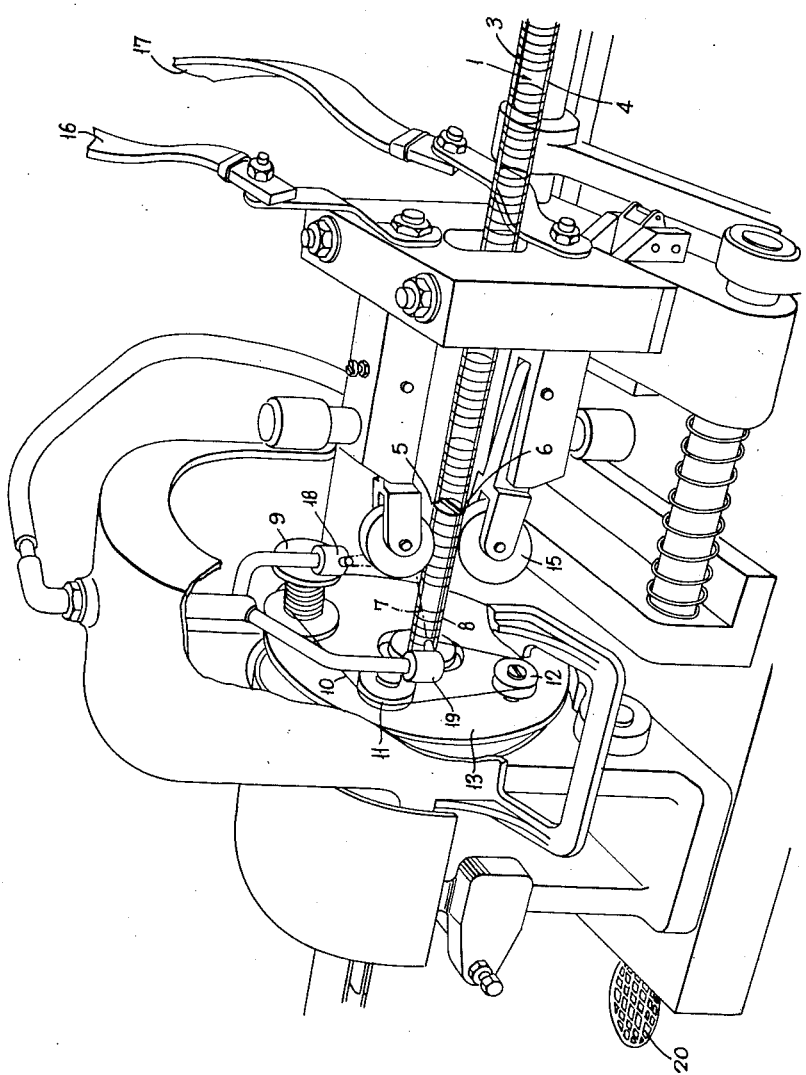
INVENTORS
CLAYTON ARBUTHNOT LANE
REGINALD JOHN
BY

2,989,615
THERMIONIC VALVE GRIDS
Clayton Arbuthnot Lane, Enfield, and Reginald John, Edmonton, London, England, assignors to Siemens Edison Swan Limited, London, England, a British company
Filed Mar. 3, 1959, Ser. No. 796,816
Claims priority, application Great Britain Mar. 6, 1958
2 Claims. (Cl. 219—58)

This invention relates to the construction of thermionic valve grids and is concerned with the attachment of the turns of a helically wound grid wire to the grid support wires.

One method of attachment is to weld the helix wire to the support wires during the grid winding operation. This can be achieved by passing the wound grid between copper or copper alloy roller electrodes between which an electric current is passed, which current thus flows between the helix wires and the support wires and heats them sufficiently to effect a weld.

The most common materials in current use for the grid helix wires are molybdenum and a nickel manganese alloy. When welding either of these materials the grid mandrel and the roller electrodes become excessively hot. This limits both the life of the mandrel and of the electrodes and also the speed at which the grid can pass between the rollers. In addition owing to oxidisation it has been found virtually impossible to weld manganese nickel to support wires.

It is an object of the present invention to provide a method which overcomes the above disadvantages.

According to the present invention the method of welding grid wires to support rods of thermionic valve grids comprises passing the wound grid between a pair of rollers each of which contacts a different one of the support rods, passing current between the rollers to weld the wires to the rods and spraying liquid coolant on to both the rollers and the grid wires while passing said current.

Jets may be provided directed on to the weld and the flow of liquid can be made sufficient to flood the region of the weld.

In order that the invention may be more fully understood reference may now be made to the accompanying drawing the single figure of which shows one embodiment of the invention.

In the drawing, a continuous length 1 of a thermionic valve grid is wound in a machine designated generally by the reference numeral 2. The two support rods 3 and 4 of the grid are progressed axially through the machine in a direction from left to right and are guided in grooves 5 and 6 each provided in matching halves 7 and 8 of a mandrel shaped to conform to the required cross-section of grid 1. A spool 9 carries the grid wire 10 which is taken up from the spool round pulleys 11 and 12 and thence taken to the mandrel. Spool 9 is mounted on a head 13 which is arranged to rotate and thus wind grid wire 10 helically on support rods 3 and 4 as the support rods are progressed axially. The shape of the wound grid corresponds to the outline of the two halves 7 and 8 of the mandrel.

To weld the grid helix wire to the two support rods 3 and 4 a pair of rollers 14 and 15 are provided each of which contacts a different one of the support rods 3 and 4. An electrical current is passed between rollers 14 and 15 from an external source which supplies current to cables 16 and 17 respectively connected to the rollers. The current passing between the rollers flows through the grid helix wires at their points of contact with the support rods and is sufficient to cause the helix wires to be welded to the support rods at these points.

To prevent excessive heating of the grid and the rollers a coolant is sprayed on to both the rollers and the grid in the region of the weld. To achieve this jets 18 and 19 are provided positioned on either side of the rollers which are arranged to spray a continuous stream of coolant on to the rollers and grid. After passing over the grid the coolant falls into a drain 20 from which it flows into a tank below machine 2 from whence it is pumped back to the jets 18 and 19.

A suitable liquid for the coolant comprising a solution of one part by volume of "Solvac" (an emulsion oil marketed by the Mobil Oil Co.) to forty parts by volume of distilled water.

This procedure not only keeps the tools and electrodes cool but in the case of manganese nickel oxidation is prevented by the quantity of liquid which excludes air from the region of the weld. The emulsion oil acts to prevent rusting.

What we claim is:
1. A method of welding grid wires to the support rods of thermionic valve grids comprising progressing the wound grid axially between a pair of rollers each of which contacts a different one of the support rods, passing current between the rollers to weld the wires to the rods and flooding liquid coolant on to both the rollers and the grid wires sufficiently to exclude air from the region of the weld while passing current.

2. A method of welding grid wires to the support rods of thermionic valve grids comprising progressing the wound grid axially between a pair of rollers each of which contacts a different one of the support rods, passing current between the rollers to weld the wires to the rods and flooding a suspension of emulsion oil in water on to both the rollers and the grid wires sufficiently to exclude air from the region of the weld while passing current.

References Cited in the file of this patent
UNITED STATES PATENTS

| | | |
|---|---|---|
| 1,585,905 | Madden et al. | May 25, 1926 |
| 1,728,812 | Tobey | Sept. 27, 1929 |
| 2,418,951 | Pitt et al. | Apr. 15, 1947 |